No. 848,621. PATENTED APR. 2, 1907.
W. H. BARTLETT.
HAY LOADER.
APPLICATION FILED DEC. 4, 1905.

2 SHEETS—SHEET 1.

Witnesses
G. R. Thomas
F. C. Jones

Inventor
W. H. Bartlett
By Chandler & Chandler
Attorneys

No. 848,621. PATENTED APR. 2, 1907.
W. H. BARTLETT.
HAY LOADER.
APPLICATION FILED DEC. 4, 1905.

2 SHEETS—SHEET 2.

Witnesses
G. R. Thomas
J. C. Jones

Inventor
W. H. Bartlett

By Chandler & Chandler
Attorneys

UNITED STATES PATENT OFFICE.

WILLIAM H. BARTLETT, OF NORA, NEBRASKA.

HAY-LOADER.

No. 848,621.  Specification of Letters Patent.  Patented April 2, 1907.

Application filed December 4, 1905. Serial No. 290,206.

*To all whom it may concern:*

Be it known that I, WILLIAM H. BARTLETT, a citizen of the United States, residing at Nora, in the county of Nuckolls, State of Nebraska, have invented certain new and useful Improvements in Hay-Loaders; and I do hereby declare the following to be a full, clear, and exact description of the invention, such as will enable others skilled in the art to which it appertains to make and use the same.

This invention relates to hay-loaders.

One object is to provide an exceedingly simple, inexpensive, durable, and efficient machine of the character stated.

Another object of the invention resides in the provision of a machine for loading hay embodying such characteristics that the hay may be readily lifted and conveyed over an endless conveyer to the hay-wagon or to any other desired place.

With these and other objects in view the present invention consists in the combination and arrangement of parts, as will be hereinafter more fully described, shown in the accompanying drawings, and particularly pointed out in the appended claim.

Figure 1:
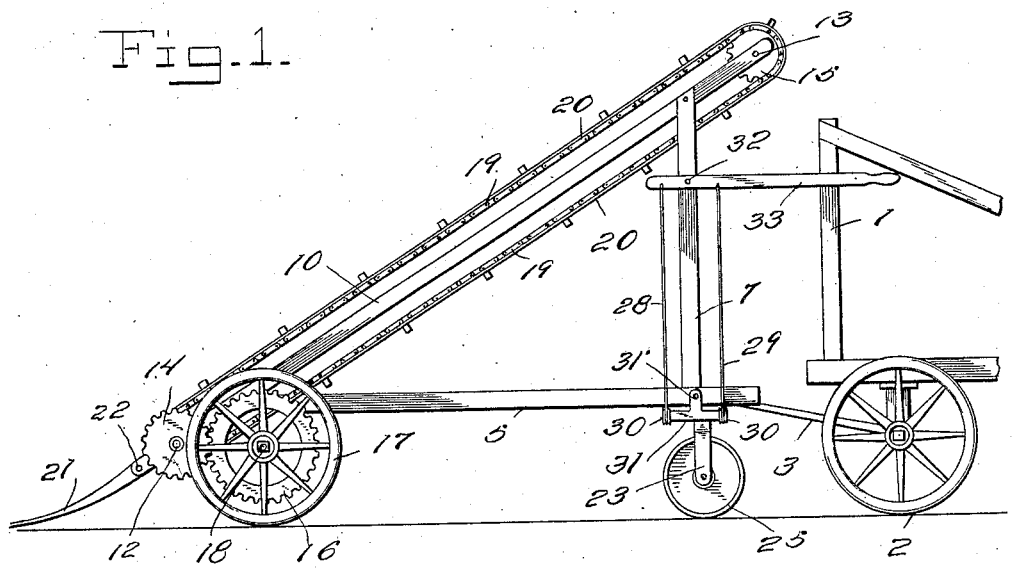
Figure 2:
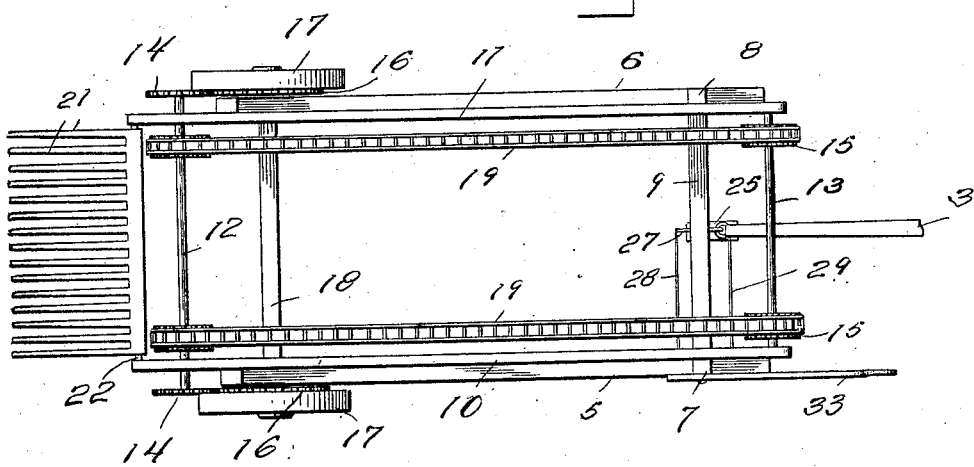
Figure 3:
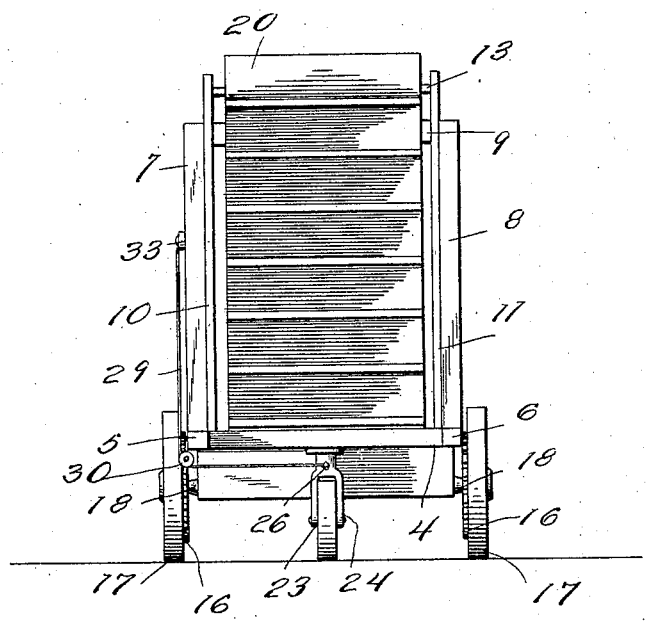
Figure 4:
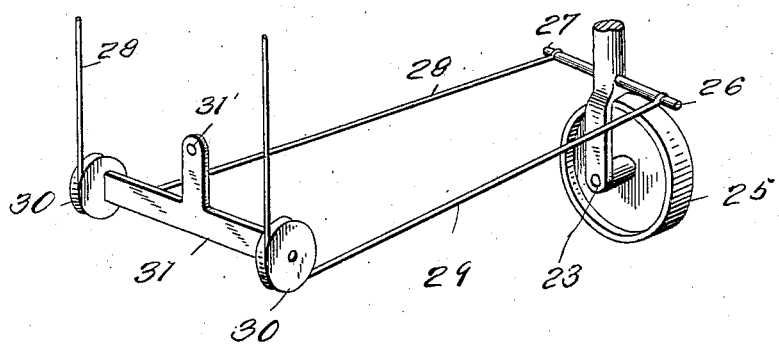

In the drawings, Figure 1 is a side elevation of my invention. Fig. 2 is a top plan view. Fig. 3 is a rear view. Fig. 4 is an enlarged detail view illustrating the connection between the steering-wheel and the means for operating the same.

Referring now more particularly to the accompanying drawings, the reference character 1 designates an ordinary hay-wagon body mounted upon wheels 2 in the usual manner and provided with a tongue 3 for connection with the rear lower cross member 4, which connects with the rear ends of the side sills 5 and 6 of the loader. The tongue is connected in the manner just stated in any suitable manner and preferably in the center of the cross-piece 4.

Mounted near the rear ends of the sills 5 and 6 are the spaced uprights 7 and 8, connected at their upper ends by the upper cross piece or member 9. Connecting the forward ends of the sills 5 and 6 and the upper ends of the respective uprights 7 and 8 are inclined braces 10 and 11, whose opposite ends project beyond the elements to which said braces are connected.

Journaled in the corresponding opposite ends of the inclined braces 10 and 11 are forward and rear shafts 12 and 13, upon each of which is mounted a pair of gear-wheels 14 and 15, respectively, the forward gear-wheels 14 meshing each with a gear-wheel 16, carried upon the inner face of the pair of forward ground-wheels 17; upon whose axle 18 the aforesaid side sills 5 and 6 are mounted. These forward and rearward pairs of sprocket-wheels are connected by the chains 19, to which latter the conveyer-apron 20 is connected in any suitable manner. This conveyer receives the hay from the teeth 21, arranged at the lower forward end of the inclined braces 10 and 11, and carries the same over the upper end of the conveyer to load the hay-wagon 1 in a manner well understood. As shown, these teeth 21 are rigidly connected together and pivoted, by means of the bar 22, to the inclined braces, so that the teeth may be turned up or elevated when desired. It is therefore obvious that the teeth 21 may be so arranged as to lift the hay from the swath onto the conveyer, from which latter it will be led to the hay-wagon.

In order to guide the loader, I secure hangers 23 and 24 to cross member 4, and in these hangers I journal a caster-wheel 25. To the axle of the caster-wheel I connect two arms 26 and 27. Each of these arms has a rope connected thereto, the ropes being designated by the reference characters 28 and 29, and each passes under the loader to one side thereof for engagement with the corresponding pulley-wheels 30, arranged at opposite ends of the arm 31, secured intermediate its ends to the side sill 5 by means of a suitable bolt 31'. From these pulleys the ropes 28 and 29 pass upwardly for connection upon opposite sides of the pivot 32 of the lever 33. By moving the lever upward or downwardly upon its pivot the caster-wheel 25 through its connections with the lever is turned accordingly for the guidance of the loader.

The receiving-wagon or hay-loader proper, 1, may be propelled in any desired manner, either by draft-animals or by a motor; but as the means of propulsion form no part of this invention further description and illustration thereof is deemed unnecessary.

What is claimed is—

A hay-loader comprising, in combination, a receiving-wagon, a loading-wagon disposed directly in front of said receiving-wagon and connected therewith; loading mechanism operatively mounted upon said loading-wagon and extending adjacent the front end of said receiving-wagon in position to discharge thereinto; a caster-wheel connected to the rear end of said loading-wagon; a lever pivotally mounted upon said loading-wagon above said caster-wheel and extending over the front end of said receiving-wagon in position to be grasped by the occupant thereof; and flexible connections between the lever and caster-wheel for turning the latter in opposite directions to guide the loading-wagon.

In testimony whereof I affix my signature in presence of two witnesses.

WILLIAM H. BARTLETT.

Witnesses:
 ALBT. VOIGT,
 CHAS. R. IMLER.